US010005550B2

(12) United States Patent
Toulmay

(10) Patent No.: US 10,005,550 B2
(45) Date of Patent: Jun. 26, 2018

(54) COMPOUND AIRCRAFT HAVING AN ADDITIONAL ANTI-TORQUE DEVICE

(71) Applicant: AIRBUS HELICOPTERS, Marignane (FR)

(72) Inventor: Francois Toulmay, Vitrolles (FR)

(73) Assignee: AIRBUS HELICOPTERS, Marignane (FR)

(*) Notice: Subject to any disclaimer, the term of this patent is extended or adjusted under 35 U.S.C. 154(b) by 382 days.

(21) Appl. No.: 15/207,771

(22) Filed: Jul. 12, 2016

(65) Prior Publication Data

US 2017/0113793 A1    Apr. 27, 2017

(30) Foreign Application Priority Data

Jul. 16, 2015   (FR) ...................... 15 01513

(51) Int. Cl.
*B64C 27/26*   (2006.01)
*B64C 27/82*   (2006.01)
*B64C 27/22*   (2006.01)
*B64C 3/32*    (2006.01)
*B64C 9/18*    (2006.01)
*B64C 3/00*    (2006.01)
*B64C 29/00*   (2006.01)

(52) U.S. Cl.
CPC .............. *B64C 27/26* (2013.01); *B64C 27/22* (2013.01); *B64C 27/82* (2013.01); *B64C 3/00* (2013.01); *B64C 3/32* (2013.01); *B64C 9/18* (2013.01); *B64C 29/0025* (2013.01); *B64C 2027/8236* (2013.01)

(58) Field of Classification Search
CPC .......... B64C 27/22; B64C 27/26; B64C 27/82
See application file for complete search history.

(56) References Cited

U.S. PATENT DOCUMENTS

| 2,575,886 A | 11/1951 | Myers |
| 4,928,907 A | 5/1990 | Zuck |
| 2005/0151001 A1 | 7/2005 | Loper |
| 2006/0157614 A1 | 7/2006 | Simpson |
| 2008/0272244 A1 | 11/2008 | Bjornenak et al. |

FOREIGN PATENT DOCUMENTS

| GB | 570455 | 7/1945 |
| JP | 2003220999 | 8/2003 |

OTHER PUBLICATIONS

French Search Report for French Application No. FR 1501513, Completed by the French Patent Office on May 3, 2016, 7 Pages.

*Primary Examiner* — Nicholas McFall
(74) *Attorney, Agent, or Firm* — Brooks Kushman P.C.

(57) ABSTRACT

A compound aircraft having a fuselage, a main rotor, a main anti-torque device and two wings positioned on either side of the fuselage. Each wing has at least one movable flap situated at its trailing edge. The flaps can be deflected asymmetrically relative to an air stream generated in reaction to the lift of the main rotor on either side of the fuselage so as to create longitudinal aerodynamic forces in opposite directions on either side of the fuselage and consequently create an additional torque that is added to the main torque from the main anti-torque device.

16 Claims, 3 Drawing Sheets

COMPOUND AIRCRAFT HAVING AN ADDITIONAL ANTI-TORQUE DEVICE

CROSS REFERENCE TO RELATED APPLICATION

This application claims priority to French patent application No. FR 15 01513 filed on Jul. 16, 2015, the disclosure of which is incorporated in its entirety by reference herein.

BACKGROUND OF THE INVENTION (1) Field of the Invention

The present invention relates to the field of anti-torque devices for rotary wing aircraft and it is intended more particularly for fitting to compound aircraft, i.e. aircraft having at least one rotary wing and at least one fixed wing.

The present invention relates to a compound aircraft having an additional anti-torque device. The additional anti-torque device provides additional torque that adds to the main torque provided by a main anti-torque device of the compound aircraft for the purpose of opposing rotor torque. The rotor torque is due to the reaction of the main rotor of the aircraft to the driving torque used for rotating the main rotor. Specifically, rotor torque tends to turn the aircraft fuselage with yaw movement opposite to the yaw movement of the main rotor. Consequently, a main anti-torque device is provided to subject the fuselage of the aircraft to yaw movement under the action of a main torque that is in the same direction as the driving torque.

(2) Description of Related Art

Rotary wing aircraft are aircraft that differ from other powered aircraft mainly in their ability to fly both at high speed in cruising flight and also at low speed, and in hovering flight. This ability is provided by fitting the aircraft with at least one rotary wing having an axis of rotation that is substantially vertical. The rotary wing is situated above a fuselage of the aircraft and is referred to as the "main rotor". The main rotor provides the aircraft with at least part of its lift and with propulsion.

A rotary wing aircraft is generally characterized by three reference directions, a longitudinal direction X extending from the front of the aircraft towards the rear of the aircraft, an elevation direction Z extending upwards perpendicularly to the longitudinal direction X, and a transverse direction Y extending from left or right perpendicularly to the longitudinal and elevation directions X and Z.

The longitudinal X is the roll axis of the aircraft, the transverse direction Y is its pitching axis, and the elevation direction Z is its yaw axis. The axis of rotation of the main rotor is close to the yaw axis of the aircraft.

A main rotor has a plurality of blades and it is driven in rotation by a power plant of the aircraft via a main power transmission system. In order to be provided with balance about the yaw axis, the aircraft is provided with main anti-torque device creating a main torque about the yaw axis. The main torque serves firstly to oppose and counterbalance the rotor torque, and secondly to provide the aircraft with maneuverability about its yaw axis, in particular in hovering flight or during specific stages of flight.

There exist various configurations for main anti-torque devices for rotary wing aircraft.

By way of example, a main anti-torque device may be constituted by an auxiliary rotor generally situated at the rear of the aircraft, at the end of a tail boom of the aircraft. The auxiliary rotor may have an axis that is fixed or that can be pivoted, and it is driven in rotation by the power plant of the aircraft by means of an auxiliary power transmission system. A main anti-torque device may also be constituted by a jet of air oriented mainly in the transverse direction Y and generally situated at the end of the tail boom of the aircraft. In these examples, the main anti-torque device creates a transverse force on the tail boom of the aircraft and consequently generates a main torque about the yaw axis.

In another example, a main anti-torque device is constituted by two propellers situated transversely on either side of the fuselage of the aircraft. These two propellers are driven in rotation by the power plant of the aircraft via an auxiliary power transmission system and they create longitudinal forces. These two propellers thus provide the aircraft with some or all of its propulsion, depending on the stage of flight of the aircraft. A difference between the longitudinal forces created respectively by each of the propellers serves to generate a main torque about the yaw axis.

Whatever the main anti-torque device that is used, it is necessary to provide the anti-torque device with mechanical power in order to create the required main torque. This mechanical power driving the anti-torque device is in addition to the mechanical power needed for driving the main rotor. The power plant of the aircraft must thus deliver sufficient mechanical power to be able to drive simultaneously the main rotor and the main anti-torque device.

In addition, the power needed both by the main rotor and by the main anti-torque device varies depending on the stage of flight. Takeoff and hovering stages of flight are generally the stages of flight making the greatest demands in terms of power.

Furthermore, a rotary wing aircraft may have at least one fixed wing providing the aircraft with some or all of its lift when flying at high speed. A fixed wing may for example comprise two wing portions situated transversely on either side of the fuselage of the aircraft under the main rotor, each of which wing portions is referred to below as a "wing". Such a rotary wing aircraft having two wings situated on respective sides of the fuselage of the aircraft is often referred to as a "compound aircraft".

With this type of configuration, the wings of the aircraft are subjected to the aerodynamic influence of the main rotor. In particular in hovering flight or during takeoff, when each wing is completely immersed in the air stream generated in reaction to the lift of the main rotor, each wing is subjected to an aerodynamic drag force that is downwardly directed and thus gives rise to negative lift. This negative lift opposes in part the lift generated by the main rotor and therefore needs to be compensated by increasing the lift from the main rotor by an amount that is equal to and opposite from the negative lift. In order to increase the lift of the main rotor, the mechanical power delivered by the power plant of the aircraft must thus also be increased.

It can be seen that the already large requirement for mechanical power needed for hovering flight of a rotary wing aircraft, or indeed for takeoff, is made even larger for a compound aircraft. Furthermore, it is found that this mechanical power needed for hovering flight or takeoff is not limited to the power demand from the main rotor for lifting the weight of the aircraft, but is increased on two counts: firstly in order to drive the main anti-torque device; and secondly to compensate for the negative lift of each wing swept by the stream of air generated in reaction to the lift of the main rotor of a compound aircraft.

For simplification purposes, the term "air stream of the main rotor" is used below to specify the stream of air that is generated in reaction to the lift of the main rotor.

Consequently, the mechanical power that needs to be delivered in order to perform hovering and takeoff is often a parameter that determines the dimensions of the power plant of the aircraft and puts a limit on its general performance. Specifically, any reduction in this mechanical power needed for hovering flight or indeed for takeoff could be a significant source of improvement in the general performance for the aircraft. In particular, it is known that reducing the power needed for hovering by 1.5% for a given driving power limit enables the total takeoff weight to be increased substantially by 1%, and consequently enables the payload of the aircraft to be increased by about 2% to 3% for unchanged empty weight of the aircraft.

One way of reducing this need for power is to reduce the power requirement for performing the anti-torque function.

In order to provide the aircraft with lift, first means consist in using two main rotors turning in opposite directions so that their torques balance. There is then no need for the aircraft to have an anti-torque device. The two main rotors may be arranged transversely relative to the aircraft, or longitudinally, or indeed on the same axis.

However, using two rotors arranged transversely or longitudinally means that the two rotors need to be connected together by power transmission shafts, in order to synchronize their movements under all circumstances. That type of architecture is usually reserved for heavy aircraft, and is therefore not suitable for medium or light aircraft.

The use of two main rotors on the same axis, although applicable to any type of aircraft, is mechanically very complex, and in particular requires the use of two concentric rotary shafts and two systems for controlling the pitch of the blades of those main rotors. Furthermore, the blades of the two main rotors must never interfere with each other, whatever the vertical deformation or rotary movements to which they might be subjected, and that imposes additional criteria on the installation and/or the stiffness of the main rotors.

Second means consist in rotating a single main rotor, not by using a power transmission system, but by placing air thrusters on each of the blades. As a result, the main rotor rotates freely about its axis without any torque or else with torque that is very low and associated solely with friction between the shaft of the main rotor and its bearings. Nevertheless, a small amount of additional torque can be generated by the drive for essential accessories such as auxiliary electricity generators or hydraulic pumps, for example. In this way, a main anti-torque device that generates only a small amount of torque in yaw suffices to balance the residual torque from the main rotor and to provide the aircraft with yaw maneuverability under all flying conditions.

Nevertheless, high speed air propulsion takes place at low efficiency. Consequently, in spite of the need for a main anti-torque device that generates little torque, the power demanded of the power plant of the aircraft is greatly increased in order to compensate for the low efficiency. Furthermore, the very high level of noise generated by such high speed air propulsion constitutes a severe drawback for that architecture.

Third means consists in providing the tail boom of the aircraft with a shape that is asymmetrical and that generates a transverse force aerodynamically when it is swept by the stream of surrounding air, and in particular the stream from the main rotor. The transverse aerodynamic force serves to create yaw force that opposes the rotor torque, in part.

However, the asymmetrical shape is not sufficient to balance all of the rotor torque, but only serves to reduce the mechanical power needed by the main anti-torque device. A main anti-torque device is thus still necessary, in particular at low speeds. The asymmetrical shape can be replaced by blowing air from one of the sides of the tail boom.

For compound aircraft, it is also possible in known manner to reduce the negative lift of the wings. For this purpose, each wing of the aircraft is provided with movable flaps, e.g. at its trailing edge. The movable flaps then serve to adjust the lift of each movable assembly formed by the wing and the flap(s) it includes.

In the description below, the term "wing-and-flap assembly" is used to designate the assembly constituted by the wing and the flap(s) it includes on either side of the longitudinal direction X. One wing-and-flap assembly is thus situated on a first side of the fuselage of the compound aircraft relative to its longitudinal direction X, and another wing-and-flap assembly is situated on a second side of the fuselage relative to the longitudinal direction X.

While the aircraft is in cruising flight and flying at high speed, each movable flap is generally positioned in continuity with the profile of the wing at a deflection angle that is small or zero, thereby optimizing the aerodynamic lift of the wing and minimizing its interfering aerodynamic drag.

Furthermore, asymmetrical movement of the flaps on either side of the fuselage enables the aircraft to be piloted in roll. Specifically, the aerodynamic lift forces of each wing-and-flap assembly are then different on either side of the fuselage leading, amongst other things, to the aircraft being moved about its roll axis.

At low speeds, and in particular during hovering flight and while taking off, the flaps may be directed downwards, forming an angle close to ninety degrees (90°) relative to the wing, so as to take the rear portion of the wing-and-flap assembly as constituted by the flaps out of the air stream from the main rotor. The flaps may also be slidably mounted and retracted into the inside of the wing. The area of each wing-and-flap assembly that is exposed to the stream of air from the main rotor is thus reduced, thereby reducing the negative lift induced by the wing-and-flap assembly. Consequently, the power needed by the main rotor is reduced by the presence of the movable flaps, and likewise the power required from the power plant of the aircraft is reduced. The movements of the movable flaps may be controlled by the pilot of the aircraft or possibly by an autopilot of the aircraft.

Nevertheless, negative lift continues to be induced by the stream of air from the main rotor on each of the wing-and-flap assemblies. Specifically, the size of the flaps is limited by constraints concerning bulk, strength, and additional weight. Consequently, the power needed by the main rotor and the power needed by the main anti-torque device are still greater than for an equivalent aircraft that does not have a wing.

It is thus advantageous to propose means enabling the mechanical power needed by the main anti-torque device to be reduced so as to be able to reduce the mechanical power demanded of the power plant of the rotary wing aircraft.

By way of example, the following documents are known: U.S. Pat. No. 2,575,886; US 2008/0272244; U.S. Pat. No. 4,928,907; and GB 570 455; which all describe an aircraft having a lift rotor, two wings situated on either side of a fuselage, and possibly one or two propulsive propellers. None of those documents describes an aircraft having an anti-torque tail rotor. Specifically, the anti-torque devices in those aircraft make use of the stream of air from the lift rotor which sweeps over aerodynamic elements in order to generate aerodynamic forces and consequently torque opposing the rotor torque.

Thus, in Document U.S. Pat. No. 2,575,886, the aircraft has a multitude of adjustable flaps on each wing and on the fuselage. According to Documents US 2008/0272244, U.S. Pat. No. 4,928,907, and GB 570 455, the wings can be adjusted as a whole, and each wing has at least one flap that is adjustable relative to the wing. Adjusting the flaps and/or the wings then makes it possible while they are being swept by the air stream from the main rotor, to generate such aerodynamic forces and consequently to generate the torque for opposing the rotor torque. The flaps and/or wings may be identical on either side of the fuselage.

Furthermore, Documents US 2006/0157614, JP 2003/220999, and US 2005/0151001 form part of the technological background of the invention.

BRIEF SUMMARY OF THE INVENTION

The present invention thus seeks to provide a rotary wing compound aircraft having an additional anti-torque device serving to reduce the mechanical power needed for the main anti-torque device, and consequently serving to reduce the mechanical power demand on the power plant of the compound aircraft.

According to the invention, a compound aircraft is defined by a longitudinal direction X extending from the front of the aircraft towards the rear of the aircraft, an elevation direction Z extending upwards perpendicularly to the longitudinal direction X, and a transverse direction Y extending from left to right perpendicularly to the longitudinal and elevation directions X and Z.

The compound aircraft comprises:

a fuselage;

a main rotor situated above the fuselage and provided with a plurality of blades driven in rotation about an axis that is substantially parallel to the elevation direction Z;

a main anti-torque device generating a main torque opposing the rotor torque generated by rotation of the main rotor;

at least one wing situated under the main rotor and extending substantially in the transverse direction Y; and at least two flaps situated beneath the main rotor, at least one flap being situated on a first side of the fuselage relative to the longitudinal direction X and at least one flap being situated on a second side of the fuselage, each flap extending parallel to the transverse direction Y, each flap being connected to a wing and being movable relative to the wing.

According to the invention, each flap is connected either to a common aerodynamic wing or else to a distinct aerodynamic wing. On either side of the fuselage of the compound aircraft, each wing co-operates with the flap(s) that are connected thereto to form a wing-and-flap assembly.

The term "common aerodynamic wing" is used to designate a wing that extends on both sides of the longitudinal direction X, being situated beneath the fuselage of the aircraft or above the fuselage.

The term "distinct aerodynamic wing" is used to mean a wing fastened to the fuselage of the aircraft and extending on one side only of the longitudinal direction X. The aircraft then has at least two wings, at least a first wing being situated on a first side of the longitudinal direction X and at least a second wing being situated on a second side of the fuselage.

Preferably, each flap is positioned at the trailing edge of a wing.

The movement of each flap is controlled by an actuator, such as a hydraulic jack or a motor. The actuator may act directly on the flap or it may act indirectly, e.g. via a linkage.

In addition, a computer controls each actuator in order to control the movement of a flap.

This compound aircraft is remarkable in that the wing-and-flap assembly situated on a first side of the fuselage and the wing-and-flap assembly situated on the second side of the fuselage have longitudinal aerodynamic coefficients $C_T$ that are different and preferably of opposite signs when they are subjected mainly to the stream of air from the main rotor. This stream of air from the main rotor thus creates longitudinal aerodynamic forces that are preferably in opposite directions on these wing-and-flap assemblies on either side of the fuselage, and consequently they generate additional torque that is in addition to the main torque.

During forward flight of the compound aircraft, the wing-and-flap assemblies are subjected to an air stream that is mainly directed longitudinally from the front towards the rear of the aircraft as generated by the aircraft moving forward. The wing-and-flap assemblies situated under the main rotor are also subjected to an air stream mainly oriented downwards and generated in reaction to the lift of the main rotor. During stages of hovering flight and takeoff, and also during flight at low speed, the wing-and-flap assemblies are thus subjected mainly, and possibly only, to this air stream from the main rotor. Furthermore, each wing-and-flap assembly has an aerodynamic profile generating vertical and longitudinal aerodynamic forces when the wing-and-flap assemblies are subjected to this stream of air, regardless of whether the stream of air is generated by the aircraft moving forwards or in reaction to the lift of the main rotor. These vertical and longitudinal aerodynamic forces generated on each wing-and-flap assembly are functions respectively of a vertical aerodynamic coefficient $C_N$ and of a longitudinal aerodynamic coefficient $C_T$ of each wing-and-flap assembly.

The sign convention for these vertical and longitudinal aerodynamic coefficients $C_N$ and $C_T$ is defined by the reference frame formed by the longitudinal, transverse, and elevation directions X, Y, and Z.

The longitudinal aerodynamic coefficient $C_T$ of the wing-and-flap assembly is oriented along the longitudinal direction X and is therefore positive going from the leading edge of the wing towards the trailing edge, i.e. from the front of the aircraft towards the rear of the aircraft.

The vertical aerodynamic coefficient $C_N$ of the wing-and-flap assembly is oriented along the elevation direction Z and is therefore positive going upwards and negative going downwards.

Advantageously, according to the invention, the longitudinal aerodynamic coefficients $C_T$ of each of the wing-and-flap assemblies are thus different and advantageously in opposite directions on either side of the fuselage. As a result, the preponderant effect of the invention is to create longitudinal aerodynamic forces generated by the stream of air from the main rotor acting on these wing-and-flap assemblies, these longitudinal aerodynamic forces being significantly different and preferably of opposite signs on either side of the fuselage.

Thus, on a first side of the fuselage of the aircraft, a first longitudinal aerodynamic force generated on each wing-and-flap assembly is advantageously directed towards the rear of the aircraft, whereas on the second side of the fuselage, a second longitudinal aerodynamic force generated on each wing-and-flap assembly is advantageously directed towards the front of the aircraft. The first side of the fuselage where the longitudinal aerodynamic force is directed towards the rear of the aircraft is determined depending on the direction of rotation of the main rotor of the aircraft so that the additional torque generated by the asymmetry between the first and second longitudinal aerodynamic forces is oriented in the same direction as the torque of the rotation of the main rotor, thereby opposing the rotor torque.

Consequently, additional torque about an axis parallel to the elevation direction Z is added to the main torque so as to oppose the rotor torque generated by the rotation of the main rotor of the aircraft.

The wing-and-flap assemblies and the main rotor acting via the air stream from the main rotor thus constitute an additional anti-torque device participating in countering the rotor torque of the aircraft in addition to the main anti-torque device.

As a result, the main torque delivered by the main anti-torque device of the aircraft can be reduced. Furthermore, the additional torque is generated from the air stream from the main rotor and is therefore obtained without additional mechanical power being delivered to the main rotor. The mechanical power needed by the main anti-torque device is then reduced, and consequently the need for mechanical power from the power plant of the aircraft is also reduced.

Preferably, these longitudinal aerodynamic forces are in opposite directions and of equal magnitudes on either side of the fuselage of the aircraft so as to generate this additional torque without any interfering force appearing that might disturb the equilibrium of the aircraft.

Nevertheless, the magnitudes of these longitudinal aerodynamic forces could be different on either side of the fuselage of the aircraft. An interfering longitudinal force corresponding to the difference between the intensities of the longitudinal aerodynamic forces would then appear on one side of the aircraft, which interfering longitudinal force could be directed towards the front or towards the rear of the aircraft. This interfering longitudinal force would then need to be compensated by an additional longitudinal aerodynamic force generated by longitudinally tilting the plane of rotation of the blades of the main rotor so as to maintain stable hovering flight for the aircraft, but without that constituting a significant drawback for application of the invention.

Likewise, the longitudinal aerodynamic forces could be in the same direction, with their magnitudes being different. Additional torque is then generated by the difference between the magnitudes of the longitudinal aerodynamic forces, and an interfering longitudinal force appears on both sides of the fuselage.

Furthermore, the flaps may be directed differently relative to the stream of air from the main rotor on either side of the fuselage so that the longitudinal aerodynamic coefficients $C_T$ of the wing-and-flap assemblies are different on either side of the fuselage.

In a first embodiment of the invention, the compound aircraft has at least two distinct wings located respectively on either side of the fuselage relative to the longitudinal direction X and extending substantially in the transverse direction Y. The wings are stationary relative to the fuselage of the aircraft and they are placed under the main rotor.

In a second embodiment of the invention, the compound aircraft has a single common wing positioned on both sides of the fuselage relative to the longitudinal direction X and extending substantially in the transverse direction Y. This common wing is stationary relative to the aircraft and is placed under the main rotor.

In like manner in both of these embodiments of the invention, the flaps are movable relative to the wings, with the movements of the flaps being defined by respective deflection angles. The aerodynamic profiles of the wings are identical on either side of the fuselage, as are the aerodynamic profiles of the flaps.

In known manner, the flaps may be deflected relative to the wings, thereby modifying the longitudinal and vertical aerodynamic coefficients $C_T$ and $C_N$ of the wing-and-flap assemblies. Thus, in cruising flight, each flap is generally positioned in continuity with the wing having a deflection angle that is substantially zero.

At low speed, and in particular while hovering or while taking off, the flaps may be positioned pointing downwards at a deflection angle close to ninety degrees (90°) so as to reduce the negative lift of each wing-and-flap assembly.

According to the invention, during stages of hovering flight and taking off, asymmetrical deflection angles of the flaps on either side of the fuselage enable longitudinal aerodynamic forces to be generated on the wing-and-flap assemblies on either side of the fuselage that are different and advantageously in opposite directions. Consequently, an additional torque is added to the main torque by virtue of these longitudinal aerodynamic forces. The deflection angles of the flaps are different on either side of the fuselage, but they are close to 90°, firstly in order to minimize the negative lift of each wing-and-flap assembly and secondly to generate the additional torque.

Advantageously, this additional torque that contributes in part to countering the rotor torque is thus obtained without affecting the efficiency of the wing-and-flap assemblies, in particular in their function of reducing negative lift, nor does it increase the complexity, the weight, or the cost of the aircraft, since the flaps and their drive mechanisms remain unchanged. Consequently, the power plant of the aircraft can be optimized by taking advantage of this additional torque.

It should be observed that the effectiveness of the additional anti-torque device and of the reduction in the negative lift of the wing-and-flap assemblies is associated directly with the area of the flaps. For example, flaps having chord lengths of less than 20% of the chord length of the wing provide only very little reduction in negative lift and in main torque, and do not justify the presence of such flaps and their drive mechanisms. Conversely, flaps of very large size are indeed very effective both for generating additional torque and for reducing negative lift, but constraints associated with their size, with the mechanisms needed for moving them, and with the forces involved make them not very advantageous in comparison with other devices, such as for example a wing that pivots as a whole.

Consequently, and in order to obtain an advantageous compromise between the effectiveness of the flaps and constraints involved with installing them, the chord length of each flap lies in the range 20% to 35% of the chord length of the wings.

Furthermore, and in order to maximize the reduction in the negative lift of the wing-and-flap assemblies, the size occupied by the flaps in the span direction of the wing, i.e. along the transverse direction Y, should be maximized. For example, the flaps extend from the wall of the fuselage to the end of the wing, or to the outer limits of the stream of air from the main rotor, if the stream does not cover the entire surface of the wing.

Furthermore, for given wing and flap areas, in order to optimize the effectiveness of the additional anti-torque device, the lever arms of the asymmetrical longitudinal aerodynamic forces should be maximized. For this purpose, the flaps should be as far away as possible from the fuselage of the aircraft.

Nevertheless, if at least one propulsive propeller is situated on a wing, the substantially longitudinal stream of air from each propulsive propeller is directed over a portion of the wing. Under such circumstances, the flaps should be positioned on each wing outside a zone that is affected by this substantially longitudinal stream of air from a propulsive propeller. Specifically, the deflection of a flap situated in such a zone of the wing that is swept by the stream of air from the propulsive propeller generates another longitudinal force directed towards the rear of the aircraft, thus opposing the propulsion force generated by the propulsive propeller and reducing its effectiveness. In addition, this other longitudinal force also reduces the effectiveness of the main anti-torque device that may be formed by the propulsive propeller(s). When the aircraft is hovering or flying at very low speed, it is also possible to avoid deflecting the flaps situated in the zone affected by the stream of air from each propulsive propeller, particularly if several flaps are arranged firstly on the wing situated on the first side of the fuselage of the aircraft and secondly on the wing situated on the second side of the fuselage.

Preferably, under such circumstances, the aircraft has a respective propulsive propeller positioned on each wing, the propulsive propellers constituting the main anti-torque device of the compound aircraft.

During hovering flight, takeoff, or indeed flight at very low speeds, if the deflection angle of the flaps is small and oriented downwards along the elevation direction Z, the magnitude of the negative lift of each wing-and-flap assembly is large as a result firstly of the generalized separation of the flow of air over the entire pressure side surface of the wing-and-flap assembly applying suction to said surface, and secondly of the extra pressure generated over the entire suction side surface of the wing-and-flap assembly.

Simultaneously, the longitudinal aerodynamic force generated on each wing-and-flap assembly is small and directed towards the leading edge of the wing, i.e. towards the front of the aircraft, or indeed it may be substantially zero. This longitudinal aerodynamic force is proportional to the longitudinal aerodynamic coefficient $C_T$ and thus negative, in application of the above-defined sign convention and relating to the vertical and longitudinal aerodynamic coefficients $C_N$ and $C_T$.

In contrast, when the deflection angle of the flaps is increased progressively downwards along the elevation direction Z, the magnitude of the negative lift of each wing-and-flap assembly decreases, and the magnitude of the longitudinal aerodynamic force generated on each wing-and-flap assembly increases, this longitudinal aerodynamic force that is generated being negative and directed towards the leading edge of the wing.

The longitudinal aerodynamic force then reaches a maximum magnitude value, the longitudinal aerodynamic force still being negative and directed towards the leading edge of the wing, and then its magnitude decreases with any continuing increase in the deflection angle of the flaps.

When the deflection angle has increased greatly and is approaching or indeed slightly exceeds an angle of 90°, the magnitude of the negative lift is equal to a value that is a minimum or very close to the minimum value. Thereafter, the magnitude of the negative lift practically ceases to vary, even if the deflection angle of the flaps continues to increase.

However, the magnitude of the longitudinal aerodynamic force on each wing-and-flap assembly decreases as the deflection angle of the flaps continues to increase and becomes zero at an inversion deflection angle $\delta_i$. Beyond the inversion deflection angle $\delta_i$, the magnitude of the longitudinal aerodynamic force on each wing-and-flap assembly increases quickly, while the direction of the longitudinal aerodynamic force is reversed and becomes oriented towards the trailing edge of the wing, i.e. towards the rear of the aircraft with the deflection angle continuing to increase: the longitudinal aerodynamic force thus varies rapidly and becomes positive in this zone.

Thereafter, beyond a stall deflection angle $\delta_D$, which is generally close to 90°, the flow of the air stream separates suddenly from the surface of the flap and the magnitude of the longitudinal aerodynamic force drops suddenly and then becomes close to zero. The magnitude of the longitudinal aerodynamic force then no longer varies even if the deflection angle continues to increase beyond this stall deflection angle $\delta_D$. This is a phenomenon of aerodynamic stall over the flap. The value of the stall deflection angle $\delta_D$ depends on the shape of the aerodynamic profile of the wing-and-flap assembly and also on the junction between the flap and the wing, and it may be less than, equal to, or indeed greater than 90°.

The principle of the invention thus consists in applying an asymmetrical deflection angle to the flaps on either side of the fuselage. A first deflection angle $\delta_1$ of each flap on a first side of the fuselage is as close as possible to the stall deflection angle $\delta_D$ but without reaching it, and thus greater than the inversion deflection angle $\delta_i$. A second deflection angle $\delta_2$ of each flap on the second side of the fuselage is less than the inversion deflection angle $\delta_i$. This second deflection angle $\delta_2$ may for example be symmetrical to the first deflection angle $\delta_1$ about the inversion deflection angle $\delta_i$.

The additional anti-torque device thus makes it possible to use a first deflection angle $\delta_1$ for which variation in the longitudinal aerodynamic coefficient $C_T$ of the wing-and-flap assembly is fast and for which the magnitude of the negative lift is close to its minimum value. The first longitudinal aerodynamic force appearing on each wing-and-flap assembly situated on the first side of the fuselage is then positive and directed towards the trailing edge of the wing, i.e. towards the rear of the aircraft. The second longitudinal aerodynamic force appearing on each wing-and-flap assembly situated on the second side of the fuselage is then negative and directed towards the leading edge of the wing, i.e. towards the front of the aircraft.

It is thus possible to define the first and second deflection angles $\delta_1$, $\delta_2$ on either side of the fuselage as follows:

$$\delta_1 = \delta_m + \frac{\Delta\delta_1}{2} \text{ and } \delta_2 = \delta_m - \frac{\Delta\delta_1}{2}$$

where $\delta_m$ is the arithmetic mean of the deflection angles on either side of the fuselage and $\Delta\delta_1$ is the difference between these deflection angles. The difference $\Delta\delta_1$ between the deflection angles may for example lie in the range 10° to 15°.

The first side of the fuselage where the first deflection angle $\delta_1$ of each flap is close to the stall deflection angle $\delta_D$ is determined depending on the direction of rotation of the main rotor of the aircraft so that the additional torque generated by these longitudinal aerodynamic forces opposes the rotor torque. Furthermore, in order to obtain a maximum additional torque, the maximum deflection angle is determined for use on this first side of the fuselage where the first longitudinal aerodynamic force is to be created that is directed towards the rear of the aircraft, while conserving a safety margin $\Delta\delta_0$ relative to the stall deflection angle $\delta_D$.

This safety margin $\Delta\delta_0$ is non-zero and serves to avoid the first longitudinal fuselage force becoming zero or very small, and consequently so as to avoid generating no significant additional torque.

By way of example, this safety margin $\Delta\delta_0$ lies in the range 2° to 5°. It is thus possible to define the first and second deflection angles on either side of the fuselage such that $\delta_2=\delta_D-\Delta\delta_0$ and $\delta_2=\delta_2-\Delta\delta_1$.

Furthermore, in order to avoid the deflection angle of a flap reaching this stall deflection angle $\delta_D$, a first mechanical abutment may be installed on the first side of the fuselage so as to limit movement of the flaps. The angular difference between the stall deflection angle $\delta_D$ and the first mechanical abutment may be equal to the safety margin $\Delta\delta_0$, for example. Likewise, a second mechanical abutment may also be installed on the second side of the fuselage. By way of example, the angular difference between the deflection angles of the flaps corresponding to the first and second mechanical abutments may be equal to the difference between the deflection angles $\Delta\delta_2$. In this way, when the flaps on both sides of the fuselage are deflected to their respective abutments, the desired deflection difference for providing the additional torque is achieved in reliable and safe manner, which additional torque is advantageously at its maximum.

The effectiveness of the additional anti-torque device is influenced not only by the dimensions and the installation of the flaps, but also by the shape of the junction between a wing and a flap, in particular. Specifically, an air suction zone may appear over the convex portion of each flap in this zone where it joins the wing, in the vicinity of large deflection angles. For this purpose, the radius of curvature of this convex portion of the flap should be as large as possible and aerodynamic continuity with the stationary portion of the wing should be as good as possible without any break appearing in its surface, without excessive slack, and without any leakage of air between the suction side and the pressure side of the flap. Nevertheless, the flap must not degrade the performance of the profile of the wing at low angles of incidence when the flap is not deflected or when it is deflected by a small angle, as in a position for high speed flight.

Furthermore, a large radius of curvature for this convex portion of the flap advantageously makes it possible to increase the value of the stall deflection angle $\delta_D$ of the wing-and-flap assembly while subjected to the air stream from the main rotor, thereby increasing the safety margin $\Delta\delta_0$. Consequently, the deflection angle difference $\Delta\delta_1$ may be larger, thereby increasing the magnitude of the positive longitudinal aerodynamic force, and consequently of the additional torque.

By way of example, if each flap performs central pivoting movement relative to the wing, it is possible to obtain a large radius of curvature for this convex portion of the flap by distancing the center of rotation of the flap from the suction side of the wing and the suction side of the flap. By way of example, the center of rotation may be situated inside the wing and close to the pressure side of the wing. The convex surface of the flap that appears during its deflection is then cylindrical in shape with a radius of curvature slightly less than the thickness of the wing at its junction with the flap.

It can thus be understood that the effectiveness of the additional anti-torque device depends on numerous parameters associated with the general architecture of the aircraft, with the dimensions and with the shape of the wing and of the flaps, with the linkage for moving the flaps, and with controlling the flow of air through the space between the flaps and the corresponding wing. With these parameters suitably chosen, the additional torque obtained by differential deflection of the flaps may be as much as 2% to 4% of the main torque when hovering, when the magnitude of the main torque is at its greatest, without affecting the reduction in the negative lift from the wing-and-flap assembly obtained by deflecting the flaps, which reduction is of the order of 10% to 15%. Consequently, the presence of flaps and deflecting them asymmetrically makes it possible to compensate 10% to 25% of the extra torque needed from the main rotor in order to overcome the negative lift from the wing-and-flap assembly while hovering, depending on the configuration of the wing and its flaps.

Furthermore, it is advantageous to observe that a component of the tangential speed of the stream of air from the main rotor that results from the rotation of the main rotor tends to induce asymmetry of this stream of air on the deflected flaps on either side of the fuselage. This asymmetry of the stream of air on the flaps contributes to creating an additional torque that increases the torque from the additional anti-torque device so as to oppose the rotor torque.

In addition, the movement of the flaps may be controlled in several configurations in order to cause the additional torque to appear.

In a first configuration, the flaps on either side of the fuselage use the same control system as is used for deflecting the flaps in collective manner on the basis of a single deflection setpoint. Consequently, the flaps are not used in asymmetric manner except when these deflection setpoints present a value that is greater than the first abutment or a value that is greater than or equal to the second abutment. When the deflection setpoint lies beyond the limits set by the first and second abutments, the flaps are blocked respectively by the first or second abutments with this occurring in particular during hovering flight or while flying at very low speed in order to limit the negative lift of the wing-and-flap assemblies. Consequently, the deflection angles of the flaps are different on either side of the fuselage of the aircraft and additional torque is generated as described above.

In a second configuration, the flaps on either side of the fuselage have their own control systems that serve to deflect the flaps in individual manner on either side of the fuselage in compliance with one or more deflection setpoints.

In a first mode of operation that is symmetrical, the deflection setpoints are identical on either side of the fuselage of the aircraft. Consequently, the operation of this second configuration is then identical to the operation of the first configuration, additional torque being generated when the deflection setpoint is greater than the first abutment or greater than or equal to the second abutment.

In a second mode of operation that is asymmetrical, the deflection setpoints may be different on either side of the fuselage of the aircraft. The flaps can be used asymmetrically with small deflection angles of the flaps, in particular for the purpose of controlling or balancing roll while the aircraft is flying at high speed. Consequently, during hovering flight or flight at very low speed, the deflection setpoints have values that are different and large in order firstly to limit the negative lift of the wing-and-flap assemblies and secondly to generate the additional torque. Furthermore, when the deflection setpoints lie beyond the limits set by the first abutment and/or by the second abutment, the flaps are blocked respectively by the first and/or second abutments. Consequently, the deflection angles of the flaps are different on either side of the fuselage of the aircraft and the additional torque is generated.

Whatever the control configuration of the flaps, the deflection setpoint is determined by the pilot of the aircraft or by an autopilot present in the aircraft.

In addition, whatever the control configuration of the flaps, the additional torque is advantageously generated without any extra complication to the installation or the control of the flaps, and without any increase in the weight of the compound aircraft, and without any additional cost.

Furthermore, the flap control systems need to be designed so as to guarantee very reliable operation in flight, i.e. so as to ensure a probability of failure that is extremely low. Specifically, if the position of one of the flaps were to become blocked other than by encountering an abutment, or if it were to differ considerably from its deflection setpoint, the longitudinal aerodynamic forces could be extremely unbalanced on either side of the fuselage, thereby putting the structure of the aircraft and/or control of its flight into danger.

If it is not possible to guarantee very great reliability in operation, each flap control system must at the very least be capable of recognizing and signaling failure in a manner that is extremely safe. Each flap control system must also make it possible very quickly to block the movement of a flap in its instantaneous position in the event of failure being detected. In order to avoid creating potentially dangerous asymmetry of flap deflection angles, blocking the flaps in position must take place simultaneously on both control systems in the event of a failure being signaled on either of these two systems. Blocking the flaps in position is not considered to be a serious or catastrophic event on a compound aircraft since it is always possible to fly in a limited flight envelope and land safely regardless of the position of the flaps when they are blocked, providing the positions in which they are blocked do not lead to excessive unbalance in the longitudinal aerodynamic forces.

The present invention also provides a method of generating an additional torque for a compound aircraft, the aircraft being situated in a reference frame constituted by a longitudinal direction X extending from the front of the aircraft towards the rear of the aircraft, an elevation direction Z extending upwards perpendicularly to the longitudinal direction X, and a transverse direction Y extending from left to right perpendicularly to the longitudinal and elevation directions X and Z. The aircraft comprises:

a fuselage;

a main rotor situated above the fuselage, being provided with a plurality of blades and driven in rotation about an axis that is substantially parallel to the elevation direction Z and that serves to provide the aircraft with lift as a result of the aerodynamic lift of the blades;

a main anti-torque device generating a main torque opposing the rotor torque $C_R$ generated as a result of rotating the main rotor;

at least one wing situated beneath the main rotor and extending substantially in the transverse direction Y; and at least two flaps situated beneath the main rotor, at least one flap being situated on a first side of the fuselage relative to the longitudinal direction X, at least one flap being situated on a second side of the fuselage relative to the longitudinal direction X, each flap extending substantially in the transverse direction Y, each flap being connected to a wing and being movable relative to the wing, each wing co-operating with the flap(s) connected thereto to form a wing-and-flap assembly on each side of the fuselage.

The wing-and-flap assemblies generate longitudinal aerodynamic forces directed in the longitudinal direction X on either side of the fuselage under the effect of the air stream generated in reaction to the aerodynamic lift of the main rotor and, consequently, they generate an additional torque that adds to the main torque in order to oppose the rotor torque $C_R$, said wing-and-flap assemblies having identical aerodynamic profiles and the flaps being oriented asymmetrically relative to the air stream generated in reaction to the aerodynamic lift of the main rotor on either side of the fuselage so that the longitudinal aerodynamic coefficient $C_T$ of the aerodynamic profiles are different on either side of the fuselage.

The method comprises the following steps:

a step of defining a deflection angle for the movement of each flap, with a first deflection angle $\delta_1$ of each flap situated on the first side of the fuselage being greater than an inversion deflection angle $\delta_i$ and less than a stall deflection angle $\delta_D$, while a second deflection angle $\delta_2$ of each flap situated on the second side of the fuselage is less than the inversion deflection angle $\delta_i$, the longitudinal aerodynamic coefficient $C_T$ of each wing-and-flap assembly being zero for a deflection angle of the flaps equal to the deflection angle $\delta_i$, the stall deflection angle $\delta_D$ corresponding to aerodynamic stall of each flap; and a step of moving each flap respectively through its deflection angle $\delta_2$, $\delta_2$.

Furthermore, during the step of defining a deflection angle in this method, the first deflection angle $\delta_1$ is defined with a non-zero safety margin $\Delta\delta_0$ relative to the stall deflection angle $\delta_D$; and the second deflection angle $\delta_2$ is defined with a deflection angle difference $\Delta\delta_1$ relative to the first deflection angle $\delta_1$ such that $\delta_1=\delta_D-\Delta\delta_0$ and $\delta_2=\delta_1-\Delta\delta_1$.

BRIEF DESCRIPTION OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
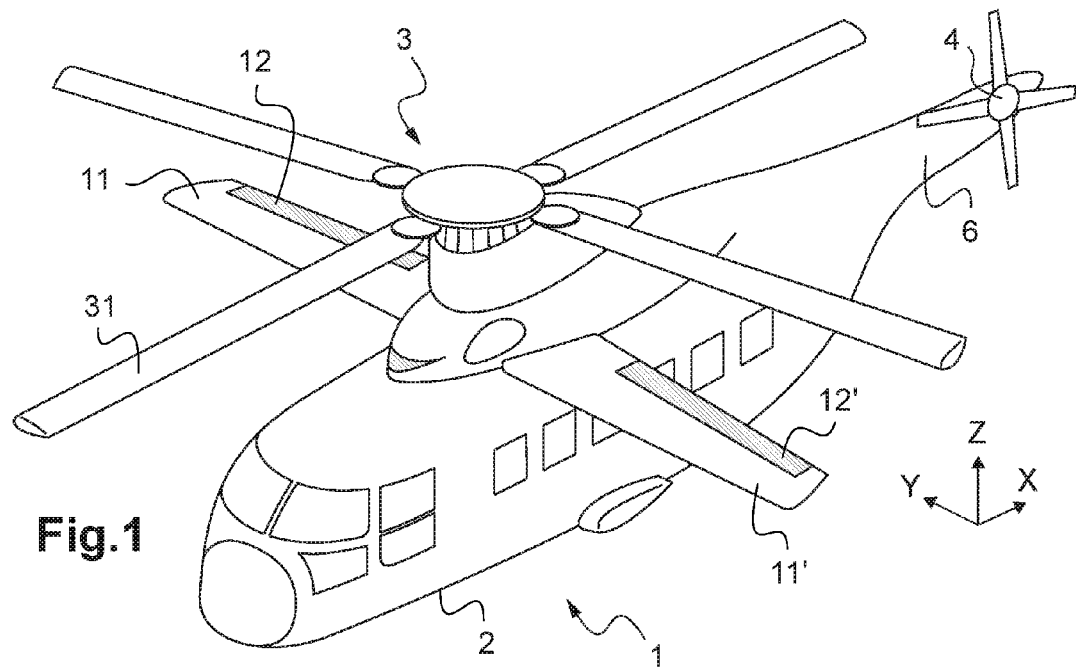
FIGS. 1 and 2 show two embodiments of a compound aircraft of the invention.
Figure 2:
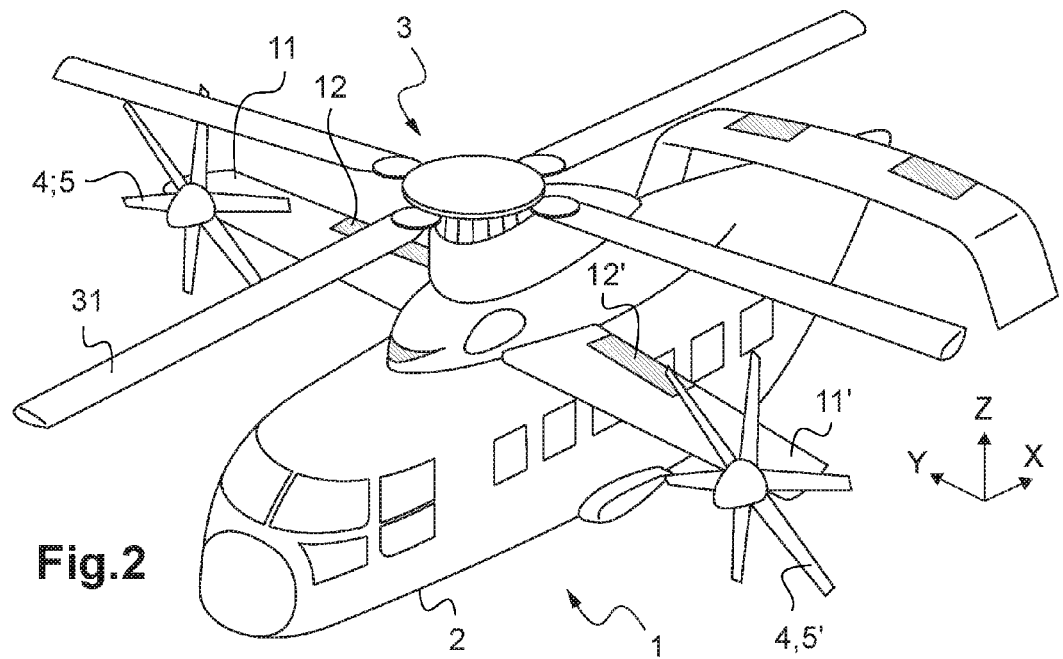

In FIGS. 1 and 2 there can be seen a compound aircraft 1 having a fuselage 2, a main rotor 3 positioned above the fuselage 2, two wings 11, 11' each having a respective flap 12, 12', and a main anti-torque device 4.

Furthermore, an X, Y, Z reference frame is associated with the aircraft 1. The longitudinal direction X extends from the front of the aircraft 1 towards the rear of the aircraft 1, the elevation direction Z extends upwards perpendicularly to the longitudinal direction X, and the transverse direction Y extends from left to right perpendicularly to the longitudinal and elevation directions X and Z.

The longitudinal direction X is the roll axis of the aircraft 1, the transverse direction Y is its pitching axis, and the elevation direction Z is its yaw axis.

The main rotor 3 has an axis of rotation that is substantially vertical, i.e. substantially parallel to the elevation direction Z, and it is provided with four main blades 31. The main rotor 3 provides the aircraft 1 with propulsion and indeed lift.

A wing 11, 11' is situated on each side of the fuselage 2, below the main rotor 3. The span of each wing 11, 11' is in the transverse direction Y and its chord is in the longitudinal direction X. Each wing 11, 11' conventionally has a pressure side surface and a suction side surface. A movable flap 12, 12' is positioned at the trailing edge of each wing 11, 11'.

In a first embodiment of the compound aircraft 1 shown in FIG. 1, the main anti-torque device 4 is constituted by a tail rotor positioned at the rear end of a tail boom 6 of the aircraft 1. The axis of rotation of this tail rotor is substantially horizontal and parallel to the transverse direction Y. In this first embodiment of the aircraft 1, each flap 12, 12' extends essentially along the span of the wing 11, 11' in order to maximize its effect. Two compound aircraft 1 in this first embodiment of the invention are also shown in plan view in FIGS. 3 and 4.

In a second embodiment of the compound aircraft 1 shown in FIG. 2, the main anti-torque device 4 is constituted by two propulsive propellers 5, 5' positioned on respective ones of the wings 11, 11'. The axis of rotation of each propulsive propeller 5, 5' is substantially horizontal and parallel to the longitudinal direction X. In this second embodiment of the aircraft 1, each flap 12, 12' is not present in the zone swept by the wash from each propulsive propeller 5, 5' so as to avoid opposing the effects of the propulsive propeller 5, 5'.

Figure 6:
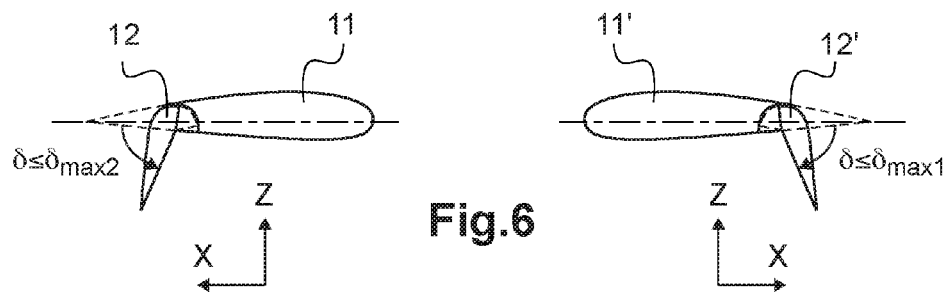
FIG. 6 shows two detail views of a wing-and-flap assembly.

Whatever the embodiment, each flap 12, 12' is movable in pivoting relative to the corresponding wing 11, 11' on which it is installed, as shown in FIG. 6. It is considered that a flap 12, 12' has a deflection angle δ that is zero when the chord of the flap 12, 12' lies in continuity with the chord of the wing 11, 11'. This deflection angle δ is then formed by the angle between the current position of the flap 12, 12' and its position when in continuity with the wing 11, 11', as shown in FIG. 6.

In cruising flight, the deflection angle δ of the flap 11, 11' is small and serves to adjust the aerodynamic lift of the wing 11, 11'. The longitudinal aerodynamic force on the wing 11, 11' remains small and substantially symmetrical for a stream of air having an angle of incidence that is itself small relative to the wing 11, 11', i.e. for a stream of air upstream from the wing 11, 11' substantially parallel to the longitudinal direction X.

In contrast, when the aircraft 1 is in hovering flight, taking off, or indeed flying at very low speed, the air stream sweeping the wing 11, 11' parallel to the longitudinal direction X is small or even non-existent. However, under the effect of reaction to the lift from the main rotor 3, a stream of air upstream from the wing 11, 11' is substantially parallel to the elevation direction Z. This stream of air flows downwards and thus first encounters the pressure side surface of the wing 11, 11'. The angle of incidence of this air stream relative to the wing 11, 11' is then of the order of −90°, with the usual convection whereby the angle of incidence is measured as being positive when the air stream approaches the wing 11, 11' via the pressure side surface, and negative when the air stream approaches the wing 11, 11' via the suction side surface.

Consequently, the generalized separation of the flow of this air stream that begins firstly at the leading edge of the wing 11, 11' and secondly at the trailing edge of a flap 12, 12', causes suction to apply to the pressure side surface and pressure to apply to the suction side surface. Consequently, a negative aerodynamic lift force appears at each wing-and-flap assembly 11 & 12, 11' & 12', which force is downwardly directed in the elevation direction Z and thus opposes the lift generated by the main rotor 3, and there also appears a longitudinal aerodynamic force in the longitudinal direction X.

When the flaps 12, 12' are moved through a deflection angle δ close to 90° they serve to reduce in particular the area of the suction side profile of the wing-and-flap assembly 11 & 12, 11' & 12' that is subjected to this stream of air from the main rotor 3, and consequently serves to reduce the magnitude of the negative lift. This vertical aerodynamic force considered in each individual section normal to the transverse direction Y of the wing-and-flap assembly 11 & 12, 11' & 12' and subjected to the stream of air is proportional in particular to a vertical aerodynamic coefficient also referred to as the normal coefficient $C_N$.

Moving the flaps 12, 12' also makes it possible to modify the longitudinal aerodynamic force considered in the same section of the wing-and-flap assembly 11 & 12, 11' & 12'. This longitudinal aerodynamic force is proportional in particular to the longitudinal aerodynamic coefficient also known as the tangential coefficient $C_T$. The variation in longitudinal aerodynamic coefficient $C_T$ for the air stream having an angle of incidence of −90°, i.e. corresponding to the air stream from the main rotor 3, is plotted in FIG. 5 as a function of the deflection angle δ of a flap 12, 12'.

It can be seen that this longitudinal aerodynamic coefficient $C_T$ is negative for a deflection angle δ of the flap 12, 12' lying between values 0 and $δ_i$, zero for an inversion deflection angle $δ_i$, and positive for a deflection angle δ lying between the values $δ_i$ and $δ_D$.

This variation in the longitudinal aerodynamic coefficient $C_T$ of the wing-and-flap assembly 11 & 12, 11' & 12', and consequently of the longitudinal aerodynamic force, is the result in particular of the variation in the amplitude and the direction of the extra pressure exerted on the suction side surface of the flap 12, 12' and on the convex surface providing the junction between the flap 12, 12' and the wing 11, 11' as a result of the increase in the deflection angle δ of the flap 12, 12'.

On approaching the inversion deflection angle $δ_i$, the flow of the air stream over the convex portion at the suction side of the flap 12, 12' continues to accelerate with a corresponding reduction in application of Bernoulli's principle, thereby having the effect of inverting the sign of the longitudinal aerodynamic coefficient $C_T$ on passing through this inversion deflection angle $δ_i$ and consequently of inverting the direction of the longitudinal aerodynamic force that appears on each wing-and-flap assembly 11 & 12, 11' & 12'.

In addition, aerodynamic stall of the flap 12, 12' occurs at the stall deflection angle $δ_D$, thereby leading to a sudden separation of the flow of the air stream from the surface of the flap 12, 12', and consequently heading to a drop in the longitudinal aerodynamic coefficient $C_T$. It is also found that the variation in the longitudinal aerodynamic coefficient $C_T$ is very fast for deflection angle values immediately preceding the stall deflection angle $δ_D$.

Specifically, by positioning the flaps 12, 12' on either side of the fuselage 2 with respective deflection angles that are greater than and less than the inversion deflection angle $δ_i$, the two wing-and-flap assemblies 11 & 12, 11' & 12' have longitudinal aerodynamic coefficients $C_T$ that are different and of opposite signs, and consequently they are subjected to longitudinal aerodynamic forces $F_1, F_2$ that are different and in opposite directions. Since these longitudinal aerodynamic forces $F_1, F_2$ are of opposite signs and since they are situated on either side of the fuselage 2, they serve to create the desired additional torque about the axis of rotation of the main rotor 3, this additional torque being additional to the main torque from the main anti-torque device 4 in order to balance the rotor torque $C_R$ of the main rotor 3 of the compound aircraft 1.

Nevertheless, the deflection angle $\delta$ of the flaps 12, 12' must not reach the stall deflection angle $\delta_D$ in order to avoid any sudden loss in the desired additional torque. For this purpose, a first mechanical abutment corresponding to a first maximum deflection angle $\delta_{max1}$ may be installed on a first wing 11 situated on a first side of the fuselage 2. This first maximum deflection angle $\delta_{max1}$ must therefore be strictly less than the stall deflection angle $\delta_D$. A safety margin $\Delta\delta_0$ is thus used between the first maximum deflection angle $\delta_{max1}$ and the stall deflection angle $\delta_D$. This safety margin $\Delta\delta_0$ may lie in the range 2° to 5°, for example.

Furthermore, in order to ensure that the magnitudes of the longitudinal aerodynamic forces $F_1$, $F_2$ are sufficient to generate a significant amount of additional torque, a deflection angle difference $\Delta\delta_1$ needs to be maintained between the deflection angles of the flaps 12 and 12' on either side of the fuselage 2. For this purpose, a second mechanical abutment may be installed on a second wing 11' situated on a second side of the fuselage 2, this second mechanical abutment corresponding to a second maximum deflection angle $\delta_{max2}$. This second maximum deflection angle $\delta_{max2}$ is strictly less than the first maximum deflection angle $\delta_{max1}$, with the difference between the first and second maximum deflection angles $\delta_{max1}$ $\delta_{max2}$ and corresponding to the deflection angle difference $\Delta\delta$, lying for example in the range 10° to 15°.

Figure 5:
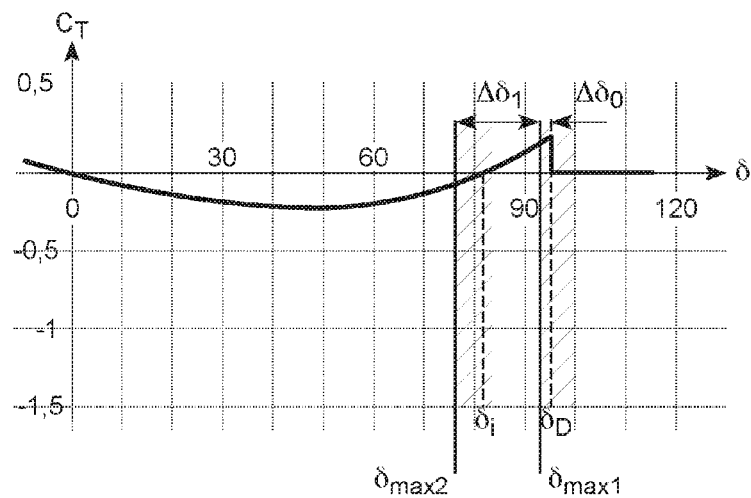
FIG. 5 is a graph showing the variation in the longitudinal aerodynamic coefficient $C_T$ of a wing-and-flap assembly.

Advantageously, using first and second abutments enables better use to be made of the zone having a steep gradient for the longitudinal aerodynamic coefficient $C_T$ of each flap 12, 12', as shown in the graph of FIG. 5, with the difference between the longitudinal aerodynamic forces being at a maximum between the two sides of the fuselage 2 for a relatively small deflection angle difference between the flaps 12, 12', while still remaining in the zone where the magnitude of the negative lift of the wing-and-flap assemblies 11 & 12, 11' & 12' is at a minimum.

Which one of the wings 11, 11' that is to carry the first and second abutments respectively is determined depending on the direction of rotation of the main rotor 3, and consequently on the rotor torque $C_R$ induced by the rotation of the main rotor 3 on the fuselage 2 of the compound aircraft 1.

Figure 3:
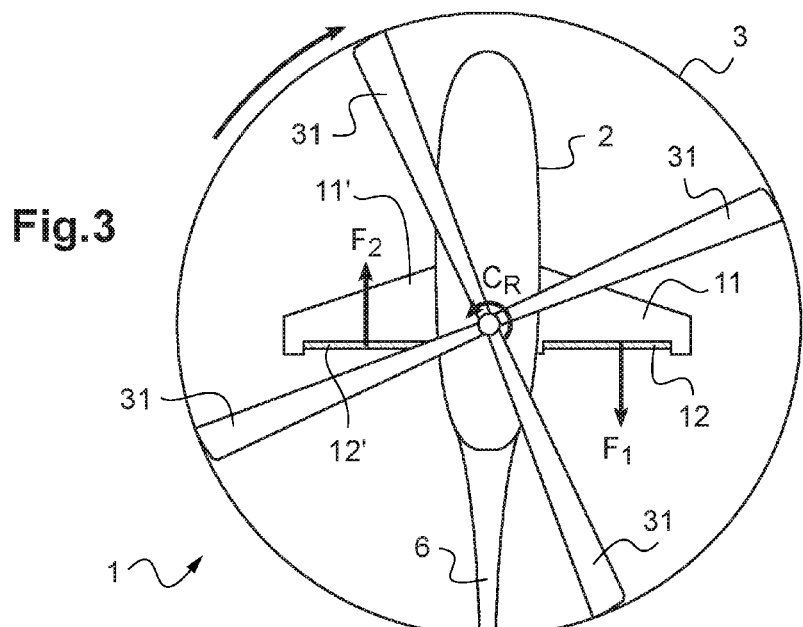
FIGS. 3 and 4 are two plan views of two compound aircraft of the invention.

In a first example shown in FIG. 3, the main rotor 3 as seen from above rotates clockwise and the rotor torque $C_R$ that is applied to the fuselage 2 about the axis of rotation of the main rotor 3 is directed counterclockwise. In order to balance this rotor torque $C_R$, the main anti-torque device 4 of the tail rotor type generates a transverse force $F_{acp}$ directed towards the left of the fuselage 2 in FIG. 3 and this transverse force $F_{acp}$ creates a main torque opposing the rotor torque $C_R$.

The additional torque generated by the longitudinal aerodynamic forces $F_1$, $F_2$ needs to add to the main torque. The first longitudinal aerodynamic force $F_1$ applied to a first wing 11 on a first side of the fuselage 2 towards which the transverse force $F_{acp}$ from the main anti-torque device 4 is not directed, i.e. the right side of the fuselage 2 in FIG. 3, is directed towards the rear of the aircraft 1, and the second longitudinal aerodynamic force $F_2$ applied to a second wing 11' situated on the second side of the fuselage 2 towards which the transverse force $F_{acp}$ from the main anti-torque rotor 4 is directed, i.e. the left side of the fuselage 2 in FIG. 3, is directed towards the front of the aircraft 1.

As a result, the first flap 12 situated at the trailing edge of the first wing 11 needs to have a deflection angle greater than the deflection angle of the second flap 12' situated at the trailing edge of the second wing 11'. In accordance with the sign convention being used, the first longitudinal aerodynamic force $F_1$ must be positive, i.e. directed from the front of the aircraft 1 towards the rear of the aircraft 1. For this purpose, the longitudinal aerodynamic coefficient $C_T$ of the first wing-and-flap assembly 11 & 12 needs to be positive, corresponding to a deflection angle $\delta$ of the first flap 12 that is greater than the inversion deflection angle $\delta_i$. The longitudinal aerodynamic coefficient $C_T$ of the first wing-and-flap assembly 11 & 12 is then situated in the steep gradient zone shown in the graph of FIG. 5.

Consequently, this first wing 11 has the first mechanical abutment for limiting the deflection angle of the first flap 12 to the first maximum deflection angle $\delta_{max1}$. The second wing 11' has the second mechanical abutment for limiting the deflection angle of the second flap 12' to the second maximum deflection angle $\delta_{max2}$.

Figure 4:
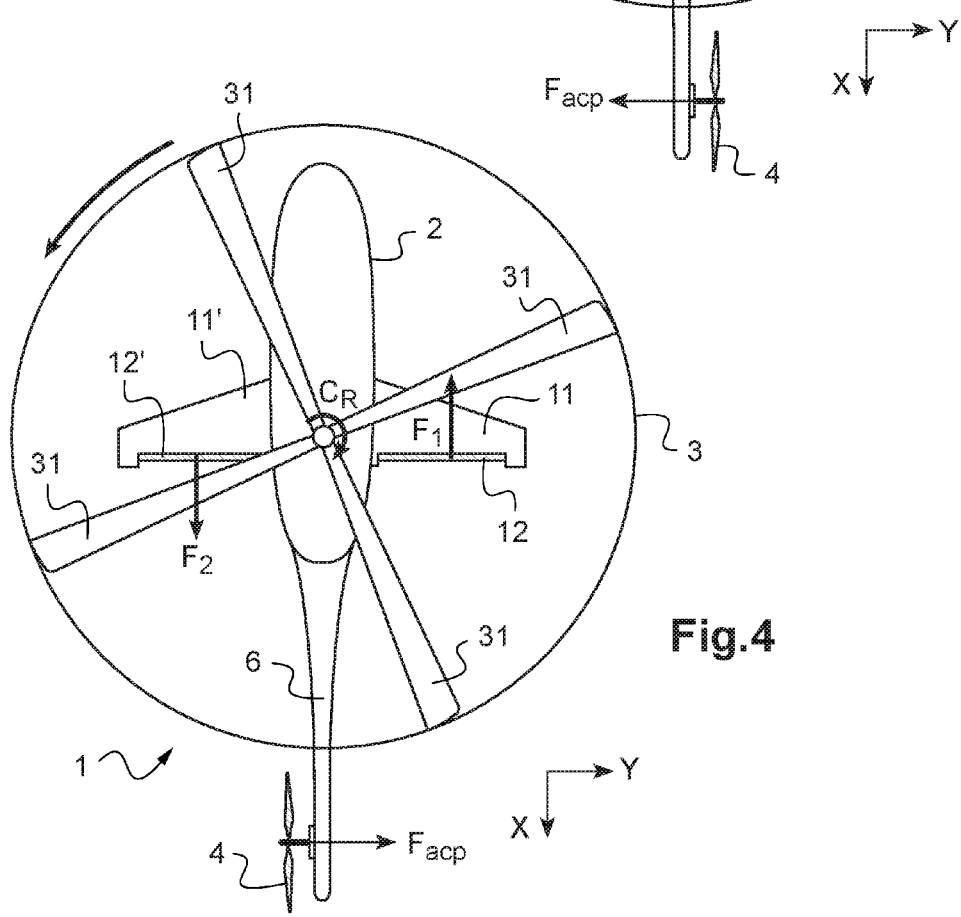

In a second example shown in FIG. 4, the main rotor 3 seen from above rotates in the counterclockwise direction and the rotor torque $T_R$ applied to the fuselage 2 around the axis of rotation of the main rotor 3 is clockwise. In this situation, the first longitudinal aerodynamic force $F_1$ applied to the first wing 11 needs to be directed towards the front of the aircraft 1 and the second longitudinal aerodynamic force $F_2$ applied to a second wing 11' needs to be directed towards the rear of the aircraft 1.

The second longitudinal aerodynamic force $F_2$ then needs to be positive, as does the longitudinal aerodynamic coefficient $C_T$ of the second wing-and-flap assembly 11' & 12', the deflection angle $\delta$ of the second flap 12' must thus be greater than the inversion deflection angle $\delta_i$. The longitudinal aerodynamic coefficient $C_T$ of the second wing-and-flap assembly 11' & 12' is then situated in this steep gradient zone.

Consequently, as shown in FIG. 6, the second wing 11' has the first mechanical abutment in order to limit the deflection angle of the second flap 12' to the first maximum deflection angle $\delta_{max1}$. The first wing 11 has the second mechanical abutment in order to limit the deflection angle of the first flap 12 to the second maximum deflection angle $\delta_{max2}$.

Thus, while hovering, taking off, or flying at very low speed, the flaps 12, 12' are deflected at respective large angles close to 90° in order to minimize the negative lift of the wing-and-flap assemblies 11 & 12, 11' & 12'. The movement of the flaps 12, 12' is then limited by the first and second abutments respectively to the first maximum deflection angle $\delta_{max1}$ and to the second maximum deflection angle $\delta_{max2}$. Thus, additional torque is added to the main torque for balancing the rotor torque $C_R$ but without degrading the reduction in negative lift. Consequently, the power plant of the compound aircraft 1 is less heavily loaded, firstly because of this reduction in negative lift and secondly because of the presence of the additional torque that makes it possible to off-load the main anti-torque device.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A compound aircraft situated in a reference frame constituted by a longitudinal direction X extending from the front of the aircraft towards the rear of the aircraft, an elevation direction Z extending upwards perpendicularly to the longitudinal direction X, and a transverse direction Y extending from left to right perpendicularly to the longitudinal and elevation directions X and Z, the aircraft comprising:
- a fuselage;
- a main rotor situated above the fuselage, being provided with a plurality of blades and driven in rotation about an axis that is substantially parallel to the elevation direction Z and that serves to provide the aircraft with lift as a result of the aerodynamic lift of the blades;
- a main anti-torque device generating a main torque opposing the rotor torque $C_R$ generated as a result of rotating the main rotor;
- at least one wing situated beneath the main rotor and extending substantially in the transverse direction Y; and
- at least two flaps situated beneath the main rotor, at least one flap being situated on a first side of the fuselage relative to the longitudinal direction X, at least one flap being situated on a second side of the fuselage relative to the longitudinal direction X, each flap extending substantially in the transverse direction Y, each flap being connected to a wing and being movable relative to the wing, each wing co-operating with the flap(s) connected thereto to form a wing-and-flap assembly on each side of the fuselage; and
- the wing-and-flap assemblies generating longitudinal aerodynamic forces directed in the longitudinal direction X on either side of the fuselage under the effect of the air stream generated in reaction to the aerodynamic lift of the main rotor and, consequently, generating an additional torque that adds to the main torque in order to oppose the rotor torque $C_R$, the wing-and-flap assemblies having identical aerodynamic profiles and the flaps being oriented asymmetrically relative to the air stream generated in reaction to the aerodynamic lift of the main rotor on either side of the fuselage so that the longitudinal aerodynamic coefficient $C_T$ of the aerodynamic profiles are different on either side of the fuselage;
- wherein the movement of each flap is defined by a deflection angle, with a first deflection angle $\delta_1$ of each flap situated on the first side of the fuselage being greater than an inversion deflection angle $\delta_i$ and less than a stall deflection angle $\delta_D$, while a second deflection angle $\delta_2$ of each flap situated on the second side of the fuselage is less than the inversion deflection angle $\delta_i$, the longitudinal aerodynamic coefficient $C_T$ of each wing-and-flap assembly being zero for a deflection angle of the flaps equal to the deflection angle $\delta_i$, the stall deflection angle $\delta_D$ corresponding to aerodynamic stall of each flap.

2. An aircraft according to claim 1, wherein the longitudinal aerodynamic forces are in opposite directions on either side of the fuselage.

3. An aircraft according to claim 1, wherein the first deflection angle $\delta_1$ and the second deflection angle $\delta_2$ are symmetrical about the inversion deflection angle $\delta_i$.

4. An aircraft according to claim 1, wherein the first deflection angle $\delta_1$ is determined with a non-zero safety margin $\Delta\delta_0$ relative to the stall deflection angle $\delta_D$, and the second deflection angle $\delta_2$ is determined with a deflection angle difference $\Delta\delta_1$ relative to the first deflection angle $\delta_1$ such that $\delta_1=\delta_D-\Delta\delta_0$ and $\delta_2=\delta_1-\Delta\delta_1$.

5. An aircraft according to claim 4, wherein the deflection angle difference $\Delta\delta_1$ lies in the range ten degrees to fifteen degrees (10° to 15°).

6. An aircraft according to claim 4, wherein the safety margin $\Delta\delta_0$ lies in the range two degrees to five degrees (2° to 5°).

7. An aircraft according to claim 1, wherein the movement of each flap is defined by a deflection angle, and each wing has a mechanical abutment limiting the movements of the flaps, a first mechanical abutment being positioned on each first wing situated on the first side of the fuselage so as to limit the deflection angle of each flap situated on the first side of the fuselage to a first maximum deflection angle $\delta_{max1}$, a second mechanical abutment being positioned on each second wing situated on the second side of the fuselage so as to limit the deflection angle of each flap situated on the second side of the fuselage to a second maximum deflection angle $\delta_{max2}$.

8. An aircraft according to claim 7, wherein the first abutment is positioned with a safety margin $\Delta\delta_0$ relative to a stall deflection angle $\delta_D$ of the flap and the second mechanical abutment is positioned with a deflection angle difference $\Delta\delta_1$ relative to the first abutment, the stall deflection angle $\delta_D$ corresponding to aerodynamic stall of each flap.

9. An aircraft according to claim 1, wherein the first side and the second side of the fuselage are determined depending on the direction of rotation of the main rotor so that the additional torque opposes the rotor torque $C_R$.

10. An aircraft according to claim 1, wherein each flap has a chord length lying in the range 20% to 35% of the chord length of each wing.

11. An aircraft according to claim 1, wherein each flap is movable in pivoting relative to each wing, and the center of pivoting of a flap is situated inside the wing and close to the pressure side of the wing.

12. An aircraft according to claim 1, wherein the aircraft has a single wing that is an aerodynamically common wing extending on both sides of the longitudinal direction X.

13. An aircraft according to claim 1, wherein the aircraft has two wings comprising two aerodynamically distinct wings, a first wing being situated on a first side of the fuselage relative to the longitudinal direction X, and a second wing being situated on a second side of the fuselage relative to the longitudinal direction X.

14. An aircraft according to claim 1, wherein the aircraft has at least one propulsive propeller positioned on each wing, and each flap is positioned on each wing outside a zone that is affected by an air stream from a propulsive propeller.

15. A method of generating an additional torque for a compound aircraft, the aircraft being situated in a reference frame constituted by a longitudinal direction X extending from the front of the aircraft towards the rear of the aircraft, an elevation direction Z extending upwards perpendicularly to the longitudinal direction X, and a transverse direction Y extending from left to right perpendicularly to the longitudinal and elevation directions X and Z, the aircraft comprising:
- a fuselage;
- a main rotor situated above the fuselage, being provided with a plurality of blades and driven in rotation about an axis that is substantially parallel to the elevation direction Z and that serves to provide the aircraft with lift as a result of the aerodynamic lift of the blades;

a main anti-torque device generating a main torque opposing the rotor torque $C_R$ generated as a result of rotating the main rotor;

at least one wing situated beneath the main rotor and extending substantially in the transverse direction Y; and at least two flaps situated beneath the main rotor, at least one flap being situated on a first side of the fuselage relative to the longitudinal direction X, at least one flap being situated on a second side of the fuselage relative to the longitudinal direction X, each flap extending substantially in the transverse direction Y, each flap being connected to a wing and being movable relative to the wing, each wing co-operating with the flap(s) connected thereto to form a wing-and-flap assembly on each side of the fuselage; and the wing-and-flap assemblies generating longitudinal aerodynamic forces directed in the longitudinal direction X on either side of the fuselage under the effect of the air stream generated in reaction to the aerodynamic lift of the main rotor and, consequently, generating an additional torque that adds to the main torque in order to oppose the rotor torque $C_R$, the wing-and-flap assemblies having identical aerodynamic profiles and the flaps being oriented asymmetrically relative to the air stream generated in reaction to the aerodynamic lift of the main rotor on either side of the fuselage so that the longitudinal aerodynamic coefficient $C_T$ of the aerodynamic profiles are different on either side of the fuselage;

wherein the method comprises the following steps:

a step of defining a deflection angle for the movement of each flap, with a first deflection angle $\delta_1$ of each flap situated on the first side of the fuselage being greater than an inversion deflection angle $\delta_i$ and less than a stall deflection angle $\delta_D$, while a second deflection angle $\delta_2$ of each flap situated on the second side of the fuselage is less than the inversion deflection angle $\delta_i$, the longitudinal aerodynamic coefficient $C_T$ of each wing-and-flap assembly being zero for a deflection angle of the flaps equal to the deflection angle $\delta_i$, the stall deflection angle $\delta_D$ corresponding to aerodynamic stall of each flap; and a step of moving each flap respectively through the deflection angle $\delta_1$, $\delta_2$.

16. A method according to claim 15, wherein during the step of defining a deflection angle:

the first deflection angle $\delta_1$ is defined with a non-zero safety margin $\Delta\delta_0$ relative to the stall deflection angle $\delta_D$; and the second deflection angle $\delta_2$ is defined with a deflection angle difference $\Delta\delta_1$ relative to the first deflection angle $\delta_1$ such that $\delta_1=\delta_D-\Delta\delta_0$ and $\delta_2=\delta_1-\Delta\delta_1$.

* * * * *